United States Patent
Jafari Tafti et al.

(10) Patent No.: US 12,172,675 B2
(45) Date of Patent: Dec. 24, 2024

(54) ALGORITHM TO DETECT AND MITIGATE REAL-TIME PERCEPTUAL ADVERSIAL ATTACKS ON AUTONOMOUS VEHICLES

(71) Applicant: GM Global Technology Operations LLC, Detroit, MI (US)

(72) Inventors: Sayyed Rouhollah Jafari Tafti, Troy, MI (US); Jacob Alan Bond, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 269 days.

(21) Appl. No.: 18/061,098

(22) Filed: Dec. 2, 2022

(65) Prior Publication Data
US 2024/0182071 A1    Jun. 6, 2024

(51) Int. Cl.
*B60W 60/00* (2020.01)
*B60W 50/14* (2020.01)

(52) U.S. Cl.
CPC ........ *B60W 60/0016* (2020.02); *B60W 50/14* (2013.01); *B60W 60/0011* (2020.02);
(Continued)

(58) Field of Classification Search
None
See application file for complete search history.

(56) References Cited

U.S. PATENT DOCUMENTS

| 11,636,375 | B2 * | 4/2023 | Olabiyi | G08G 1/0129 |
| | | | | 706/12 |
| 11,726,184 | B2 * | 8/2023 | Ferreira | G01S 17/894 |
| | | | | 356/4.01 |

(Continued)

FOREIGN PATENT DOCUMENTS

| CA | 3139449 A1 * | 5/2022 | ........ B60W 60/0011 |
| CN | 118306417 A * | 7/2024 | ........... G05D 1/0088 |

(Continued)

OTHER PUBLICATIONS

A. Kloukiniotis et al., "Countering Adversarial Attacks on Autonomous Vehicles Using Denoising Techniques: A Review," in IEEE Open Journal of Intelligent Transportation Systems, vol. 3, pp. 61-80, 2022, doi: 10.1109/OJITS.2022.3142612. (Year: 2020).*

(Continued)

*Primary Examiner* — Cuong H Nguyen
(74) *Attorney, Agent, or Firm* — Vivacqua Crane, PLLC

(57) ABSTRACT

A method for mitigating an adversarial attack includes receiving input data. The input data includes sensor data from a plurality of sensors and map data. The method further includes monitoring, in real time, an environment around an autonomous vehicle to identify a region that is possibly subject to an adversarial attack and determining a probability of the adversarial attack in the region. The method further includes determining whether the probability of the adversarial attack in the region that is possibly subject to the adversarial attack is greater than a predetermined threshold and, in response, planning a motion of the autonomous vehicle by taking into account the adversarial attack to generate a planned motion. The method further includes controlling a host vehicle to move in accordance with the planned motion.

20 Claims, 5 Drawing Sheets

(52) U.S. Cl.
CPC ..... *B60W 2555/00* (2020.02); *B60W 2556/20* (2020.02); *B60W 2556/40* (2020.02)

(56) References Cited

U.S. PATENT DOCUMENTS

| | | | |
|---|---|---|---|
| 12,008,079 B1* | 6/2024 | Kolouri | G06F 18/217 |
| 2019/0266516 A1* | 8/2019 | Olabiyi | B60W 30/0956 |
| 2021/0139024 A1* | 5/2021 | Crego | B60W 30/0953 |
| 2021/0279640 A1* | 9/2021 | Tu | G06V 10/82 |
| 2022/0153298 A1* | 5/2022 | Wang | G06N 3/126 |
| 2024/0182071 A1* | 6/2024 | Jafari Tafti | B60W 60/00188 |

FOREIGN PATENT DOCUMENTS

| | | | | |
|---|---|---|---|---|
| DE | 102020215885 A1 * | 6/2022 | | G06F 21/55 |
| WO | WO-2020182591 A1 * | 9/2020 | | G01S 17/10 |
| WO | WO-2023023412 A2 * | 2/2023 | | G06F 21/566 |

OTHER PUBLICATIONS

Wang, Ningfei, et al. "Does physical adversarial example really matter to autonomous driving? towards system-level effect of adversarial object evasion attack." Proceedings of the IEEE/CVF International Conference on Computer Vision. 2023. (Year: 2023).*

Kim, Haeri, and Jong-Moon Chung. "VANET Jamming and Adversarial Attack Defense for Autonomous Vehicle Safety." Computers , Materials & Continua 71.2 (2022). (Year: 2022).*

Song, Ruoyu, et al. "Discovering adversarial driving maneuvers against autonomous vehicles." 32nd USENIX Security Symposium (USENIX Security 23). 2023. (Year: 2023).*

* cited by examiner

ALGORITHM TO DETECT AND MITIGATE REAL-TIME PERCEPTUAL ADVERSIAL ATTACKS ON AUTONOMOUS VEHICLES

The present disclosure relates to methods and systems for detecting and mitigating real-time perceptual adversarial attacks on autonomous vehicles.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some autonomous vehicles that employ machine learning may be subjected to adversarial attacks. To generate safe driving plans for the autonomous vehicles, it is desirable to develop a method and system to monitor, detect, and mitigate adversarial attacks in real time. The presently disclosed method and system identifies regions with possible adversarial attacks based on predefined criteria. Then, the identified regions are investigated thoroughly to confirm attacks. Lastly, a planning strategy is proposed to mitigate these attacks on the performance of the vehicle.

SUMMARY

The present disclosure describes a method for mitigating an adversarial attack. In an aspect of the present disclosure, the method includes receiving input data. The input data includes sensor data from a plurality of sensors and map data. The method further includes monitoring, in real time, an environment around an autonomous vehicle to identify a region of the environment around the autonomous vehicle that is possibly subject to the adversarial attack and determining a probability of the adversarial attack in the region of the environment around the autonomous vehicle that is possibly subject to the adversarial attack. The method further includes determining whether the probability of the adversarial attack in the region of the environment around the autonomous vehicle that is possibly subject to the adversarial attack is greater than a predetermined threshold and, in response to determining that the probability of the adversarial attack in the region of the environment around the autonomous vehicle that is possibly subject to the adversarial attack is greater than the predetermined threshold, planning a motion of the autonomous vehicle by taking into account the adversarial attack to generate a planned motion. The method further includes controlling a host vehicle to move in accordance with the planned motion. The method disclosed in these paragraphs improves autonomous vehicle technology by thoroughly investigating regions with possible adversarial attacks, thereby improving the reliability and robustness of autonomous driving software.

In an aspect of the present disclosure, monitoring the environment around the autonomous vehicle to identify the region of the environment around the autonomous vehicle that is possibly subject to the adversarial attack includes determining whether there is an inconsistency between the map data and the sensor data.

In an aspect of the present disclosure, monitoring the environment around the autonomous vehicle to identify the region of the environment around the autonomous vehicle that is possibly subject to the adversarial attack: determining a confidence score of a detection or classification by the plurality of sensors of an object in the environment around the autonomous vehicle; determining whether the confidence score of the detection by the plurality of sensors of the object in the environment around the autonomous vehicle is less than a predetermined confidence threshold; and in response to determining that the confidence score of the detection by the plurality of sensors of the object in the environment around the autonomous vehicle is less than the predetermined confidence threshold, identifying the region where the object is located as the region of the environment around the autonomous vehicle that is possibly subject to the adversarial attack.

In an aspect of the present disclosure, the plurality of sensors includes a first sensor and a second sensor. The first sensor has a first modality. The second sensor has a second modality. The second modality is different from the first modality. Monitoring the environment around the autonomous vehicle to identify the region of the environment around the autonomous vehicle that is possibly subject to the adversarial attack includes: determining that there is an inconsistency in a detection or classification of an object between data from a first sensor and the second sensor; and in response to determining that there is the inconsistency in the detection or classification of the object between data from the first sensor and the second sensor, identifying the region where the object is located as the region of the environment around the autonomous vehicle that is possibly subject to the adversarial attack.

In an aspect of the present disclosure, the sensor data includes remote actor data. The remote actor data includes information about the motion of a remote actor as detected by at least one of the plurality of sensors. The plurality of the sensors is part of the host vehicle. Monitoring the environment around the autonomous vehicle to identify the region of the environment around the autonomous vehicle that is possibly subject to the adversarial attack includes: determining that there is an inconsistency between the motion of the remote actor as detected by the at least one of the plurality of sensors and other perception data (i.e., sensor data) from the scene surrounding the host vehicle as detected by the at least one of the plurality of sensors. In response to determining that there is the inconsistency between the motion of the remote actor as detected by the at least one of the plurality of sensors and the other perceptual data from the scene surrounding the host vehicle as detected by the at least one of the plurality of sensors, identifying the region where the inconsistency comes from as the region of the environment around the autonomous vehicle that is possibly subject to the adversarial attack.

In an aspect of the present disclosure, the method further includes determining whether a human occupant is in the host vehicle; and requesting feedback from the human occupant in the host vehicle to confirm an existence of the adversarial attack in the region of the environment around the autonomous vehicle that is possibly subject to the adversarial attack. The probability of the adversarial attack in the region of the environment around the autonomous vehicle is determined in response to the human occupant confirming the existence of the adversarial attack in the region of the environment around the autonomous vehicle that is possibly subject to the adversarial attack.

In an aspect of the present disclosure, the input data includes crowd-sourced data originating from a remote actor or other infrastructure sensors. The crowd-sourced data includes information about an existence of the adversarial attack in the region of the environment around the autonomous vehicle that is possibly subject to the adversarial attack. The method further includes confirming the existence of the adversarial attack in the region of the environment around the autonomous vehicle that is possibly subject to the adversarial attack using the crowd-sourced data. The probability of the adversarial attack in the region of the environment around the autonomous vehicle is determined in response to confirming the existence of the adversarial attack in the region of the environment around the autonomous vehicle that is possibly subject to the adversarial attack using the crowd-sourced data.

In an aspect of the present disclosure, the method further includes: determining that the probability of the adversarial attack in the region of the environment around the autonomous vehicle that is possibly subject to the adversarial attack is not available; determining a worst-case scenario for the region of the environment around the autonomous vehicle that is possibly subject to the adversarial attack is not available; and planning the motion of the host vehicle by taking into account the worst-case scenario.

In an aspect of the present disclosure, the plurality of sensors includes a first sensor and a second sensor. The first sensor has a first modality. The second sensor has a second modality. The second modality is different from the first modality. Monitoring the environment around the autonomous vehicle to identify the region of the environment around the autonomous vehicle that is possibly subject to the adversarial attack includes determining that there is an inconsistency in a classification of an object between a detection by the first sensor and the detection by the second sensor. The object is classified as a first class based on the sensor data from the first sensor. The object is classified as a second class based on the sensor data from the second sensor. The first class is different from the second class. The method further includes, in response to determining that there is the inconsistency in the classification of the object between the detection by the first sensor and the detection by the second sensor, determining a probability that the object is classified in the second class. The method further includes determining that the probability that the object is classified in the first class is greater than a predetermined class threshold and, in response to determining that the probability that the object is classified in the first class is greater than a predetermined class threshold. The method further includes planning the motion of the autonomous vehicle by considering that the object belongs to the second class.

The method further includes determining whether a human occupant is in the host vehicle and requesting the human occupant to take manual control of the host vehicle in response to: (a) in response to determining that the probability of the adversarial attack in the region of the environment around the autonomous vehicle that is possibly subject to the adversarial attack is greater than the first predetermined threshold and less than the second predetermined threshold and (b) determining that the human occupant is in the host vehicle.

In an aspect of the present disclosure, the method further includes determining whether a human occupant is in the host vehicle and planning the motion of the autonomous vehicle by taking into account the adversarial attack to generate the planned motion in response to: (a) in response to determining that the probability of the adversarial attack in the region of the environment around the autonomous vehicle that is possibly subject to the adversarial attack is greater than the first predetermined threshold and less than the second predetermined threshold and (b) determining that the human occupant is not in the host vehicle. The planned motion includes a stop by the host vehicle within a predetermined amount of time.

The present disclosure also describes a tangible, non-transitory, machine-readable medium, including machine-readable instructions, that when executed by one or more processors, cause one or more processors to execute the methods described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
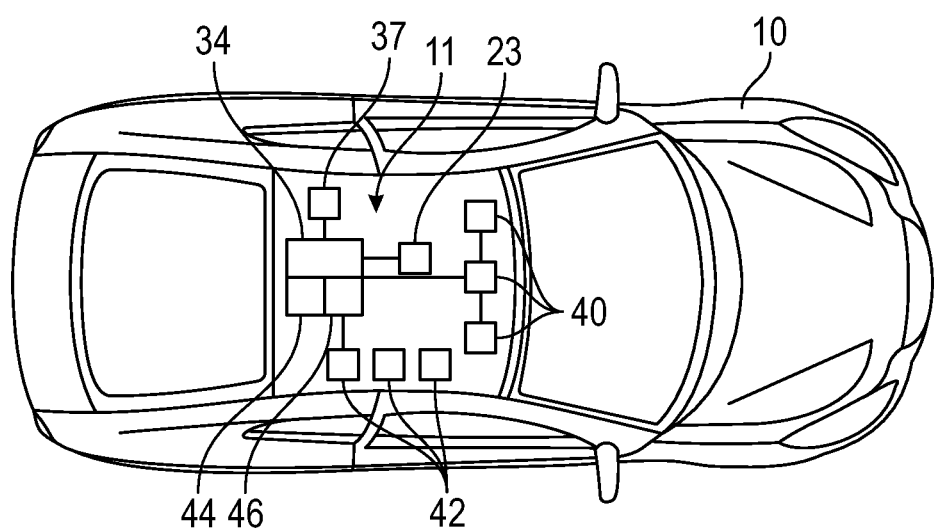
FIG. 1 is a schematic top view of a vehicle including a system for detecting and mitigating real-time perceptual adversarial attacks on autonomous vehicles.

Reference will now be made in detail to several examples of the disclosure that are illustrated in accompanying drawings. Whenever possible, the same or similar reference numerals are used in the drawings and the description to refer to the same or like parts or steps.

Figure 2:
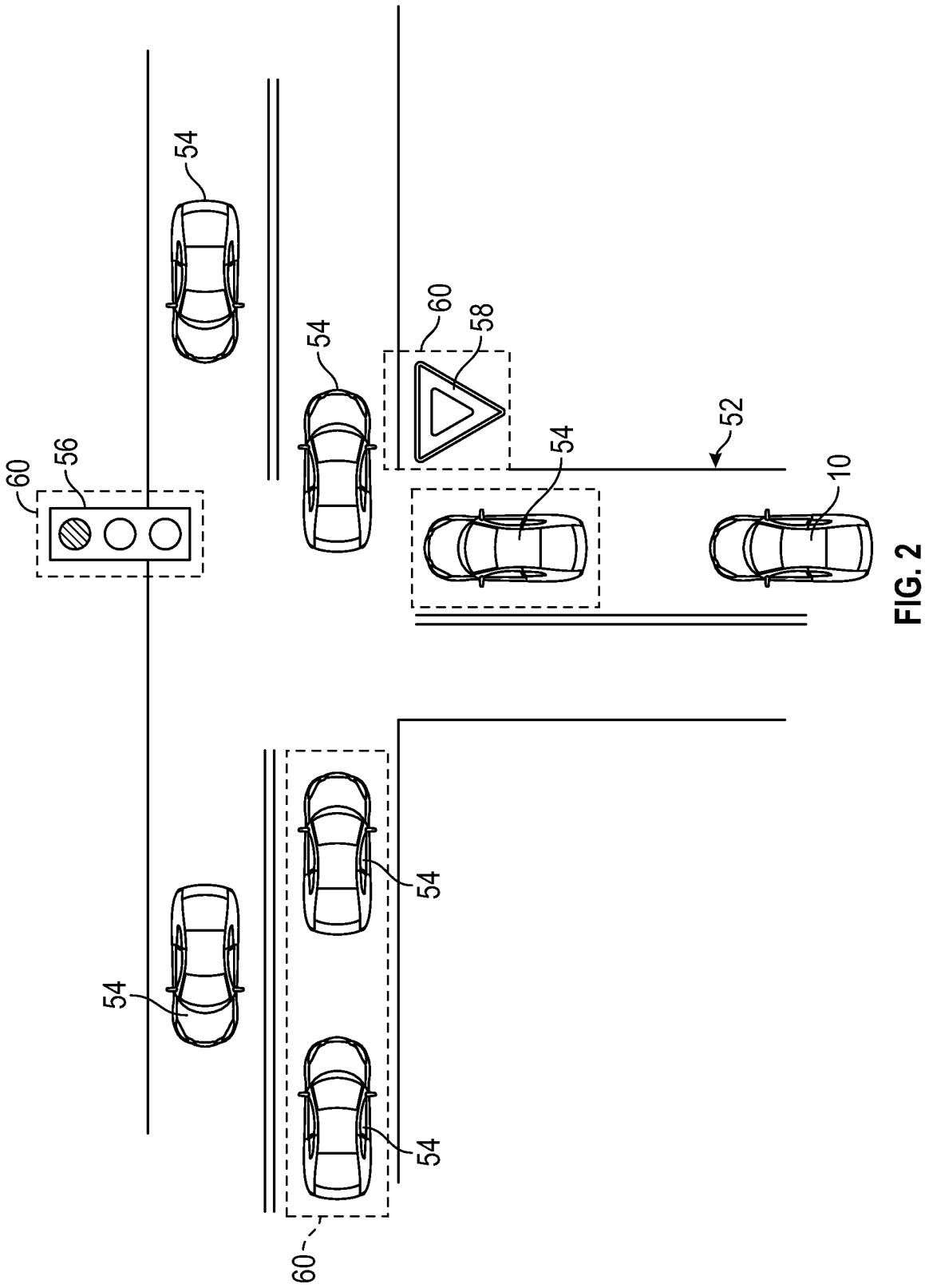
FIG. 2 is a schematic diagram illustrating adversarial attacks.

With reference to FIGS. 1 and 2, a host vehicle 10 includes (or is in communication with) a system 11 to enhance lateral assist applications in the presence of road features. While the system 11 is shown inside the host vehicle 10, it is contemplated that the system 11 may be outside of the host vehicle 10. As a non-limiting example, the system 11 may be a cloud-based system in wireless communication with the host vehicle 10. Although the host vehicle 10 is shown as a sedan, it is envisioned that that host vehicle 10 may be another type of vehicle, such as a pickup truck, a coupe, a sport utility vehicle (SUVs), a recreational vehicle (RVs), etc. The host vehicle 10 may be an autonomous vehicle configured to drive autonomously.

The host vehicle 10 includes a controller 34 and one or more sensors 40 in communication with the controller 34. The sensors 40 collect information and generate sensor data indicative of the collected information. As non-limiting examples, the sensors 40 may include Global Navigation Satellite System (GNSS) transceivers or receivers, yaw rate sensors, speed sensors, lidars, radars, ultrasonic sensors, and cameras, among others. The GNSS transceivers or receivers are configured to detect the location of the host vehicle 10 in the globe. The speed sensors are configured to detect the speed of the host vehicle 10. The yaw rate sensors are configured to determine the heading of the host vehicle 10. The cameras may have a field of view large enough to capture images in front, in the rear, and in the sides of the host vehicle 10. The ultrasonic sensor may detect dynamic objects.

The system 11 further includes a controller 34 in communication with the sensors 40. The controller 34 includes at least one processor 44 and a non-transitory computer readable storage device or media 46. The processor 44 may be a custom-made processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the host vehicle 10. The computer readable storage device or media 46 may store map data, which includes a map and other information about an area around the host vehicle 10.

The instructions may include one or more separate programs, each of which comprises an ordered listing of executable instructions for implementing logical functions. The instructions, when executed by the processor 44, receive and process signals from the cameras, perform logic, calculations, methods and/or algorithms for automatically controlling the components of the host vehicle 10, and generate control signals to the actuators to automatically control the components of the host vehicle 10 based on the logic, calculations, methods, and/or algorithms. Although a single controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the controller 34 are embodied in the system 11. The non-transitory computer readable storage device or media 46 includes machine-readable instructions (shown, for example, in FIG. 3), that when executed by the one or more processors, cause the processors 44 to execute the method 100 (FIG. 3), the method 200 (FIG. 4), and the method 300 (FIG. 5). The method 100, the method 100, and the method 300 are part of a method for monitoring, detecting, and mitigating adversarial attacks in real-time.

The vehicle 10 includes a user interface 23 in communication with the controller 34. The user interface 23 may be, for example, a touchscreen in the dashboard and may include, but is not limited to, an alarm, such as one or more speakers to provide an audible sound, haptic feedback in a vehicle seat or other object, one or more displays, one or more microphones, one or more lights, and/or other devices suitable to provide a notification or alert to the vehicle user of the vehicle 10. The user interface 23 is in electronic communication with the controller 34 and is configured to receive inputs from a vehicle user (e.g., a vehicle user or a vehicle passenger). For example, the user interface 23 may include a touch screen and/or buttons configured to receive inputs from a vehicle user. Accordingly, the controller 34 is configured to receive inputs from the vehicle user via the user interface 23 and to provide an output (i.e., an alert) to the vehicle user.

The host vehicle 10 may include one or more communication transceivers 37 in communication with the controller 34. Each of the communication transceivers 37 is configured to wirelessly communicate information to and from other remote entities, such as the remote vehicles, (through "V2V" communication), infrastructure (through "V2I" communication), remote systems at a remote call center (e.g., ON-STAR by GENERAL MOTORS, and/or personal electronic devices, such as a smart phone. The communication transceivers 37 may be configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication transceivers 37 may include one or more antennas for receiving and/or transmitting signals, such as cooperative sensing messages (CSMs). The communication transceivers 37 may be considered sensors 40 and/or sources of data. The remote vehicles may include one or more communication transceivers 37 as described above with respect to the host vehicle 10.

The host vehicle 10 includes one or more actuators 42 in communication with the controller 34. The actuators 42 control one or more vehicle features such as, but not limited to, a propulsion system, a transmission system, a steering system, and a brake system. The vehicle features may further include interior and/or exterior vehicle features such as, but are not limited to, doors, a trunk, and cabin features such as air, music, lighting, etc.

With reference to FIG. 2, the system 11 is configured to monitor, detect, and mitigate adversarial attacks on perceptual inputs. In the present disclosure, the term "adversarial attack" means an input to machine learning models that an attacker has intentionally designed to cause the machine learning model to make a mistake. While the host vehicle 10 drives on a road 52, the system 11 of the host vehicle 10 may monitor, detect, and mitigate adversarial attacks. As a non-limiting example, in the driving scenario illustrated in FIG. 2, the sensors 40 may sense the environment around the host vehicle 10. The environment around the host vehicle 10 may include, for example, remote actors 54 (e.g., remote vehicles), traffic lights 56, and traffic signs 58. An adversarial attack may occur, for example, when someone places a sticker resembling a yield sign on a stop sign (e.g., traffic sign 58). In this case, the system 11 may detect the stop sign as a yield sign. The map data, however, properly identifies the detected traffic sign 58 as a stop sign. In response to potential adversarial attacks, the system 11 identifies regions with possible attacks based on predefined criteria. Then, the identified regions are investigated thoroughly to confirm attacks. Lastly, a planning strategy is proposed to mitigate these attacks on the performance of the host vehicle 10.

The system 11 may identify regions where there is an inconsistency between the map data and the sensor data, such as lane markings, traffic signs, and traffic lights. In FIG. 2, the system 11 has identified a region 60 because the map data identifies the traffic sign 58 as a stop sign but the sensor data classifies the traffic sign as a yield sign. In other examples, the system 11 may identify regions 60 with possible adversarial attacks when an object in the map is not detected by the sensors 40. In yet another example, the system 11 may identify a region with possible adversarial attack when a map object detected by the sensors 40 is not shown in the map.

The system 11 may identify regions 60 with possible adversarial attacks when the classification and/or detection confidence score is less than a predetermined score threshold. The classification and/or detection confidence score may relate to the static and/or dynamic objects relevant to the current maneuver of the host vehicle 10. The predetermined score threshold may change as a function of the distance from the host vehicle 10 to the static and/or dynamic object relevant to the current maneuver of the host vehicle 10.

The system 11 may identify regions 60 with possible adversarial attacks in a location where there is a classification and/or detection inconsistency between sensors 40 with different sensor modalities (e.g., lidar, camera, radar). For example, the system 11 may identify a region 60 where the remote actors 54 (e.g., remote vehicles) are only identified by a camera and no other sensor. Also, the system 11 may identify regions 60 with possible adversarial attacks in a location where the difference between the classification and/or detection confidence scores of sensors 40 with different sensor modalities is greater than a predetermined confidence threshold.

The system 11 may identify a region 60 with possible adversarial attacks in a location where there is an inconsistency between the motions of the remote actors 54 and the sensor data. In other words, the region 60 with possible adversarial attacks is identified in a location where the traffic behavior is different from what it is perceived by the sensors 40. For example, the system 11 identifies a region 60 with possible adversarial attacks in locations around the traffic light 56 and another region 60 with possible adversarial attacks around the remote vehicle leading the host vehicle 10 because the leading remote vehicle is moving toward an intersection in front of the traffic light 56 while the sensor data indicates that the traffic light 56 is red.

Figure 3:
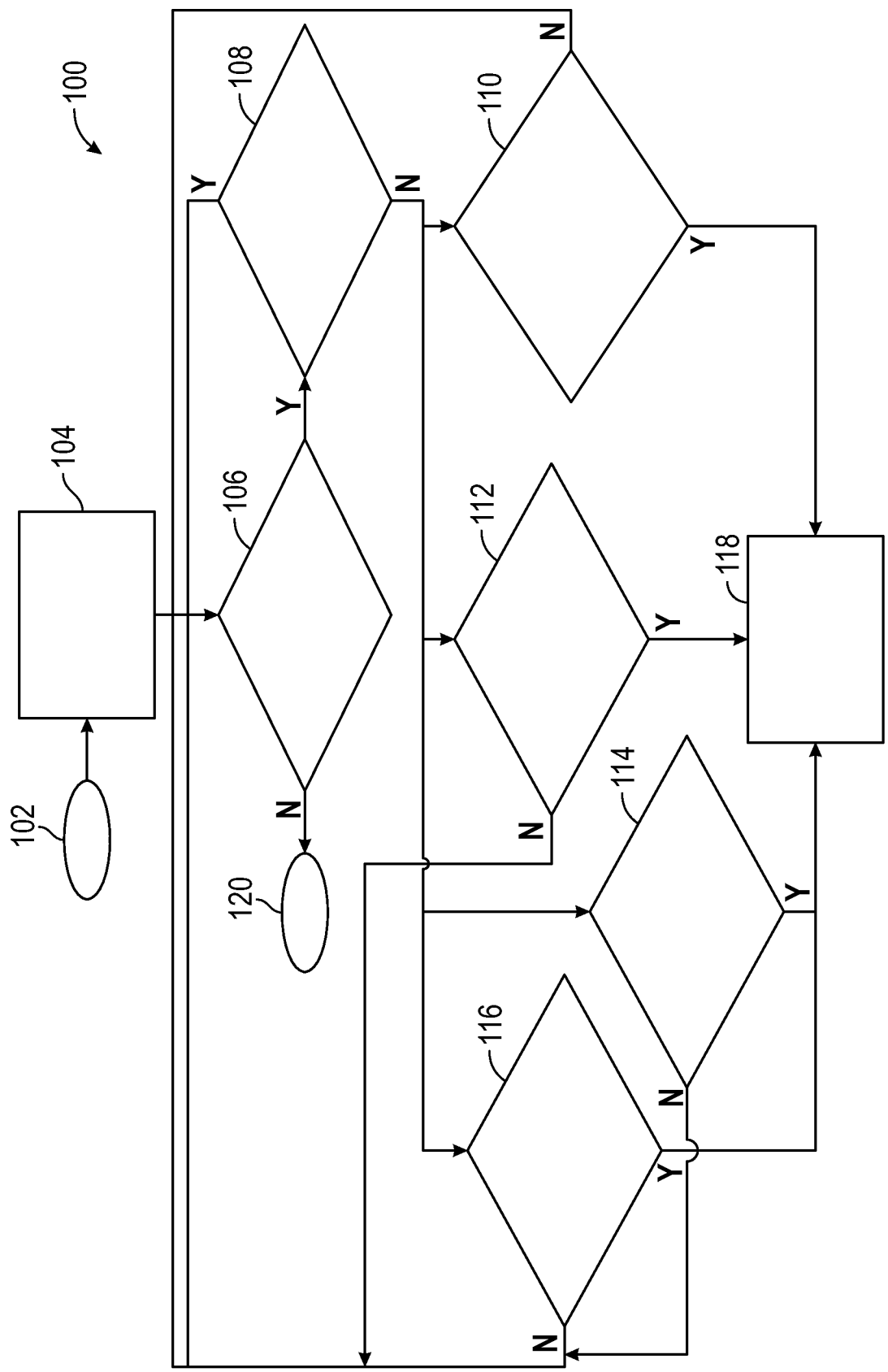
FIG. 3 is a flowchart of a method for monitoring adversarial attacks.

FIG. 3 is a flowchart of a method 100 for monitoring, in real time, adversarial attacks in the environment surrounding the host vehicle 10. The method 100 begins at block 102. Then, the method 100 continues to block 104. At block 104, the controller 34 receives input data. The input data may include sensor data and map data. The sensor data is generated by the sensors 40 and includes information about the environment around the host vehicle 10 (e.g., autonomous vehicle). Further, the sensor data may include fused data from more than one sensor 40 and sensor data from a single sensor 40. The map data may be stored in computer readable storage device or media 46 and includes a map and other information about an area around the host vehicle 10. The input data includes crowd-sourced data (e.g., V2V and/or V2I communications) originating from one or more remote actors 54 or infrastructure devices. Next, the method 100 proceeds to block 106.

At block 106, the controller 34 determines whether any object detected by the sensors 40 is still unprocessed. In other words, the controller 34 determines whether some of the objects detected by the sensors have not been analyzed using the processes in block 108, block 110, block 112, block 114, block 116, and block 118. If all the objects detected by the sensors 40 have been analyzed using the processes in block 108, block 110, block 112, block 114, block 116, and block 118, then the method 100 proceeds to block 120. At block 120, the method 100 ends. If not all of the sensor data has been analyzed using the processes in block 108, block 110, block 112, block 114, block 116, and block 118, then the method 100 proceeds to block 108.

At block 108, the controller 34 determines whether the object being analyzed has already been reported for possible adversarial attacks. Then, the method 100 continues to block 110, block 112, block 114, and block 116.

At block 110, the controller 110 determines whether an inconsistency between the motions of remote actors 54 and the sensor data about that remote actor. The sensor data includes remote actor data. The remote actor data includes information about the motion of the remote actor 54 as detected by at least one of the sensors 40. The controller 34 determines that there is an inconsistency between the motion of the remote actor 54 as detected by the at least one of the plurality of sensors 40 and other perception data from the scene surrounding the host vehicle as detected by the at least one of the plurality of sensors 40. In response to determining that there is an inconsistency between the motion of the remote actor 54 as detected by the at least one of the plurality of sensors 40 and other perception data from the scene surrounding the host vehicle as detected by the at least one of the plurality of sensors 40, the method 100 continues to block 118. At block 118, the controller 54 identifies the region where the remote actor 54 is located as the region 60 of the environment around the host vehicle 10 that is possibly subject to the adversarial attack. If the controller 110 does not identify an inconsistency between the motions of remote actors 54 and the sensor data about that remote actor 54, then the method 100 returns to block 106.

At block 112, the controller 34 determines whether there is an inconsistency in the detection or classification of the object between data from one sensor 40 with a first modality (e.g., camera) and data from another sensor 40 with a different modality (e.g., lidar). If the controller 34 determines that there is an inconsistency in the detection or classification of the object between data from one sensor 40 with a first modality (e.g., camera) and data from another sensor 40 with a different modality (e.g., lidar), then the method 100 continues to block 118. At block 118, the controller 34 identifies the region where the object is located as the region of the environment around the autonomous vehicle that is possibly subject to the adversarial attack. If the controller 34 does not determine that there is an inconsistency in the detection or classification of the object between data from one sensor 40 with a first modality (e.g., camera) and data from another sensor 40 with a different modality (e.g., lidar), then the method 100 returns to block 106.

At block 114, the controller 34 determines the confidence score of the classification and/or detection of the object by the sensors 40. The controller 34 also determines whether the confidence score of the classification and/or detection of the object by the sensors 40 of the object in the environment around the host vehicle 10 is less than a predetermined confidence threshold. If the controller 34 determines that the confidence score of the classification and/or detection of the object by the sensors 40 of the object in the environment around the host vehicle 10 is less than a predetermined confidence threshold, then the method 100 continues to block 118. At block 118, the controller 34 identifies the region where the object is located as the region of the environment around the host vehicle 10 that is possibly subject to the adversarial attack. If the controller 34 does not determine that the confidence score of the classification and/or detection of the object by the sensors 40 of the object in the environment around the host vehicle 10 is less than a predetermined confidence threshold, then the method 100 returns to block 106.

At block 116, the controller 34 determines whether there is inconsistency between the map data and the sensor data at a specific location around the host vehicle 10. If the controller 34 determines that there is inconsistency between the map data and the sensor data at a specific location around the host vehicle 10, then the method 100 continues to block 118. At block 118, the controller 34 identifies that specific location as the region of the environment around the host vehicle 10 that is possibly subject to the adversarial attack. If the controller 34 does not determine that there is inconsistency between the map data and the sensor data at a specific location around the host vehicle 10, then the method 100 returns to block 106.

Figure 4:
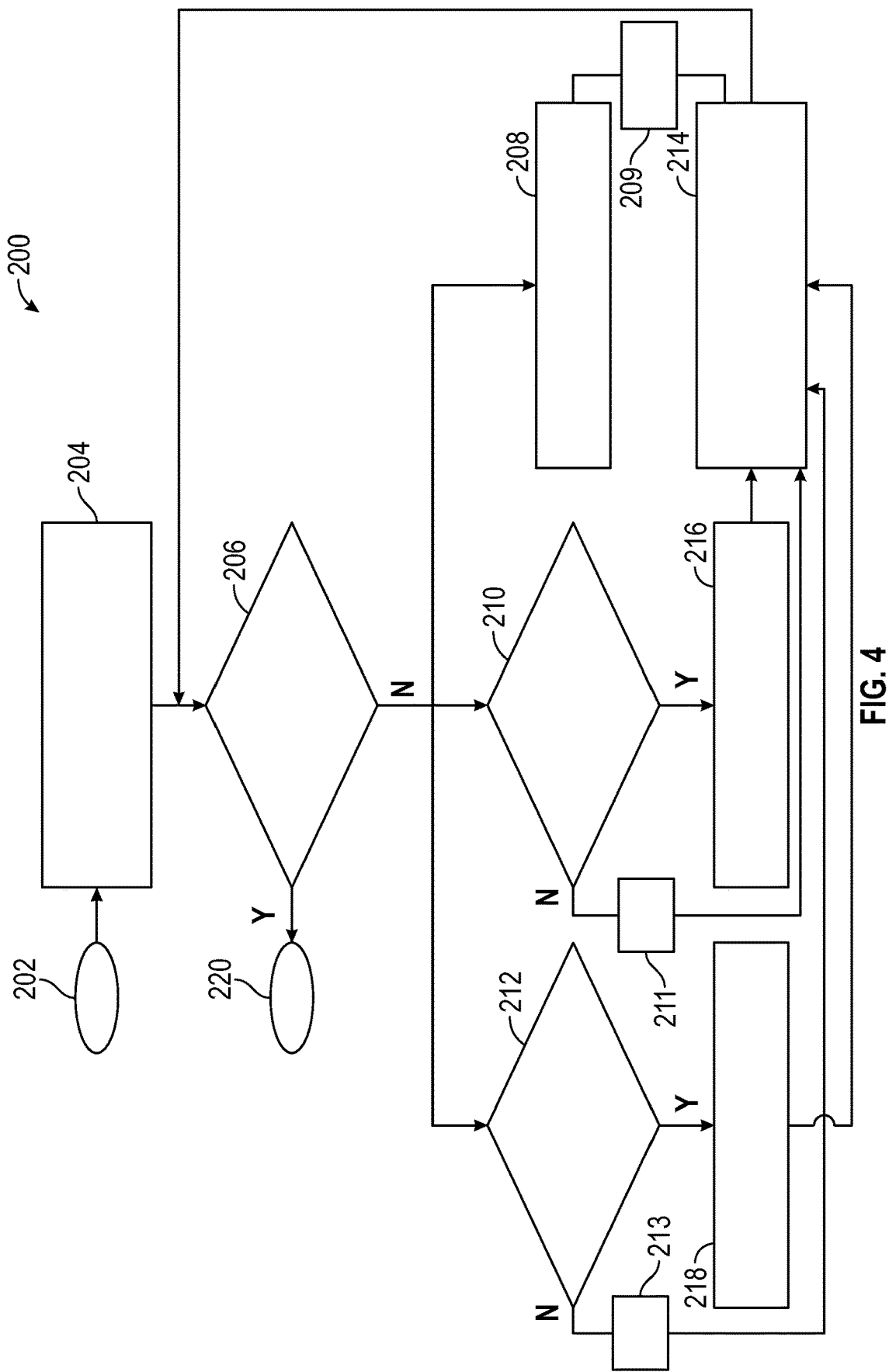
FIG. 4 is a flowchart of a method for detecting adversarial attacks.
Figure 5:
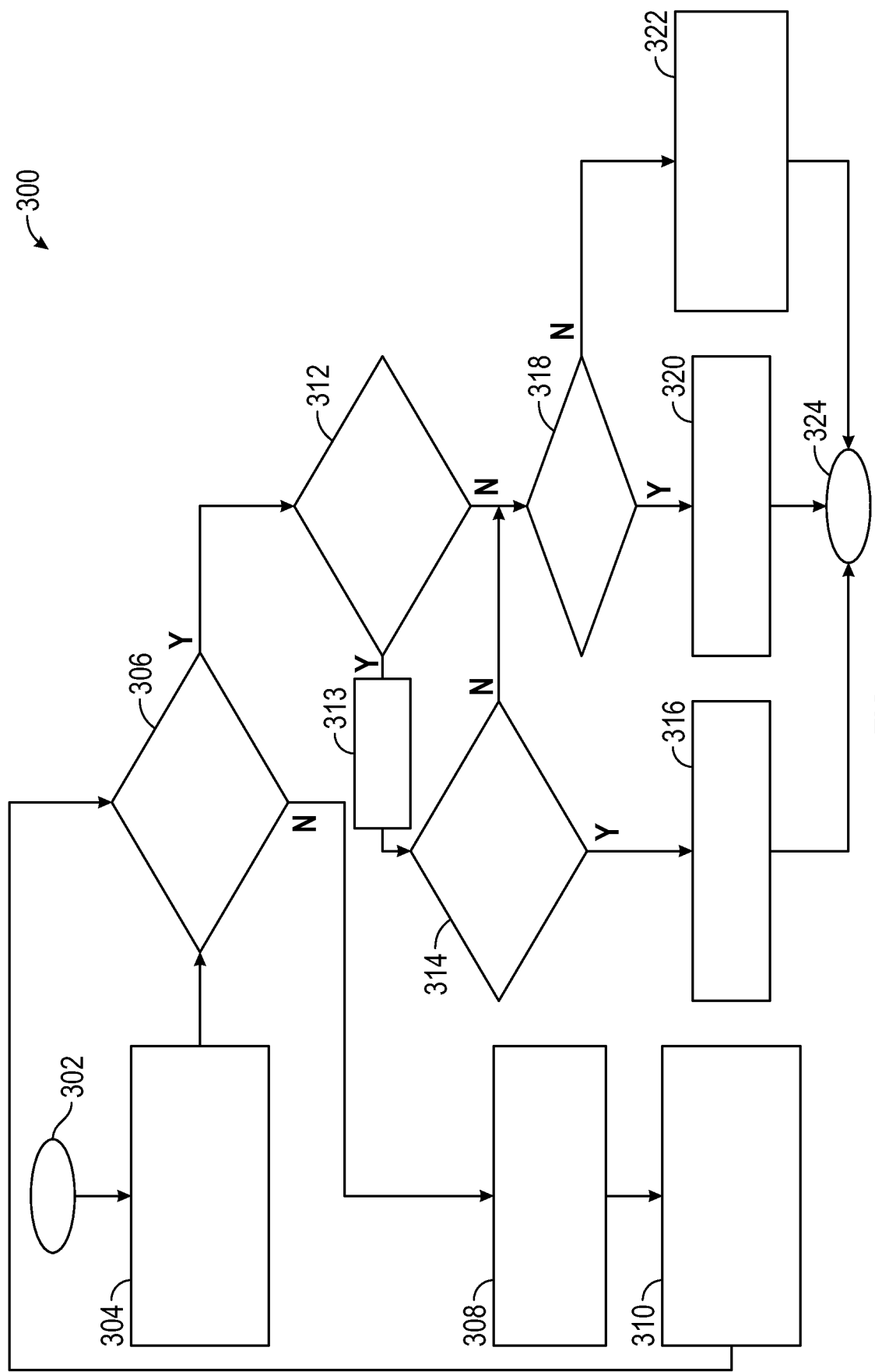
FIG. 5 is a flowchart of a method for mitigating adversarial attacks.

FIG. 4 is a flowchart of a method 200 for detecting adversarial attacks in the environment around the host vehicle 10. The method 200 begins at block 202. Then, the method 200 proceeds to block 204. At block 204, the controller 34 receives the input data and the identified regions 60 with possible adversarial attacks. As discussed above, the input data includes the sensor data, the map data, and the crowd-sourced data. Then, the method 200 continues to block 206.

At block 206, the controller 34 determines whether any identified region 60 with possible adversarial attack is still unprocessed. In other words, the controller 34 determines whether some of the identified region 60 with possible adversarial attacks have not been analyzed using the processes in block 208, block 210, block 212, block 214, block 216, and block 218. If all the identified regions 60 have been analyzed using the processes in block 208, block 210, block 212, block 214, block 216, and block 218, then the method 100 proceeds to block 220. At block 220, the method 100 ends. If not all of the identified regions 60 have been analyzed using the processes in block 208, block 210, block 212, block 214, block 216, and block 218, then the method 100 proceeds to block 208, block 210, and block 212.

At block 208, the controller 34 gathers the senor data (e.g., images) of the identified region 60 with possible adversarial attacks. Then, the method 200 proceeds to block 209. The probability in block 214 is obtained based on five inputs $f_1$, $f_2$, $f_3$, $f_4$, and $f_5$. At block 209, the controller 34 calculates the three inputs $f_1$, $f_2$, $f_3$ using the sensor data (i.e., image in the region). The input $f_4$ is obtained from block 218, and the input $f_5$ is obtained from block 216. At block 214, the controller 34 determines a probability of the adversarial attack in the identified region 60 of the environment around the host vehicle 10 that is possibly subject to the adversarial attack. This probability may be determined using the equation below:

$$P(\text{attack})=F(a_1 f_1+a_2 f_2+a_3 f_3+a_4 f_4+a_5 f_5) \quad \text{Eq. 1}$$

where:
$a_i$ are weight coefficients to be tuned (or learned);
$f_1$ is a classification and/or detection difference between standard and adversarial models;
$f_2$ is the standard deviation of classification and/or detection probabilities obtained by running multiple networks, using manipulated/augmented perception inputs (e.g., zoomed/cropped images of the proposed region)
$f_3$: is the classification and/or detection difference between generative model to compare proto-typical example versus actual input;
$f_4$: is the classification/detection confirmation from human driver/passenger, if available—feedback in the form of "yes, no, not-known"; and
$f_5$: is the recorded adversarial attack in the region from crowd-sourced data, such as V2X and cloud data.

The computations for determining the probability of the adversarial attack in the identified region 60 may be performed on cloud server and saved or shared for other learning purposes. The adversarial attack probability may be learned using the above features, and then the data may be uploaded to the cloud. The adversarial attack probabilities may be shared with the monitoring module (e.g., controller 34) to correct future region proposals. The detected adversarial attacks may be shared with other road users via the cloud and reported to road authorities.

At block 210, the controller 34 determines whether a crowd-sourced recorded attack is available. The crowd-source data from the remote actors 54 or other entities may have already recorded an adversarial attack. Therefore, the controller 34 accesses and uses the crowd-sourced data to determine whether an adversarial attack has already been recorded. If an adversarial attack has already been recorded using the crowd-sourced data, then the method 200 proceeds to block 216. If no adversarial attack has already been recorded using the crowd-sourced data, then the method 200 continues to block 211. At block 211, if there is no crowd-source data available, the input f5 is set to "None". At block 216, the controller 34 receives the data on the possible attack in the region 60. Then, the method 200 continues to block 214.

At block 212, the controller 34 determines whether a human occupant (e.g., human driver or human passenger) is in the host vehicle 10. If there is no human occupant in the host vehicle 10, then the method 200 continues to block 213. At block 213, if there is no human passenger, the input f4 is set to "None". If there is a human occupant in the host vehicle 10, then the method 200 proceeds to block 218. At block 218, the controller 34 commands the user interface 24 to request the human occupant for feedback on the identified region 60. Specifically, the controller 34 requests the human occupant, via the user interface, to confirm the existence of the adversarial attack in the region 60 identified as possibly having the adversarial attack. In response to the confirmation of the adversarial attack in the identified region 60, the method 200 proceeds to block 214.

FIG. 5 is a flowchart of a method 300 for mitigating adversarial attacks. The method 300 begins at block 302. Then, the method 300 continues to block 304. At block 304, the controller 34 receives the identified regions 60, the planning inputs, and the probabilities of an adversarial attack in the identified regions 60 once available. Then, the method 300 continues to block 306. At block 306, the controller 34 determines whether the probabilities of an adversarial attack in the identified regions 60 are available. If the probabilities of an adversarial attack in the identified regions 60 are not available, then the method 300 continues to block 308.

At block 308, the controller 34 determines a worst-case scenario for the region 60 of the environment around the host vehicle 10 that is possibly subject to the adversarial attack. For example, it may not be clear whether the traffic sign 58 in the identified region 60 is a yield sign or a stop. In this case, the worst possible scenario is that the traffic sign 58 is a stop sign. In another example, it may not be clear whether the traffic light 56 is green or red. In this case, the worst-case scenario is that the traffic light 56 is red. When the lane markings type is not clear, the worst-case scenario is that the lane markings type is solid yellow double lines. For objects on the road, the worst-case scenario is that region 60 is occupied by objects, such as remote actors 54. Then, the method 300 continues to block 310. At block 310, the controller 34 plans the motions of the host vehicle 10 by taking into account the worst-case scenario. Then, the controller 34 commands the host vehicle 10 according to the planned motion that takes into account the worst-case scenario.

At block 306, if the probabilities of an adversarial attacks in the identified regions 60 are available, then the method 300 continues to block 312. At block 312, the controller 34 determines whether the adversarial attack is confirmed. To do so, the controller 34 confirms the adversarial attack in the identified regions 60 if the probability of the adversarial attacks in the identified regions 60 is greater than a predetermined probability threshold. Alternatively, the controller 34 determines that there is no adversarial attack in the identified region 60 if the probability of the adversarial attacks in the identified regions 60 is less than a predetermined minimum threshold. If the adversarial attack in the identified region 60 is confirmed, then the method 300 continues to block 313.

At block 313, the method 300 receives that new detection/classification probabilities from detection module. Then, the method 300 continues to block 314.

At block 314, the controller 34 determines whether the probability that the object in the identified region 60 is classified in a new class is greater than a predetermined class threshold. If the probability that the object in the identified region 60 is classified in a new class is greater than a predetermined class threshold is not greater than a predetermined class threshold, then the method 300 continues to block 318. If the probability that the object in the identified region 60 is classified in a new class is greater than a predetermined class threshold, then the method 300 continues to block 316. At block 316, the controller 34 plans the motion of the host vehicle 10 based on the updated classification and/or detection. Further, the controller 34 commands the host vehicle 10 to move in according to the planned motion.

If the adversarial attack is not confirmed at block 316, then the method 300 continues to block 318. At block 318, the controller 34 determines whether a human occupant (e.g., human driver or human passenger) is in the host vehicle 10. If a human occupant is in the host vehicle 10, then the method 300 continues to block 320. At block 320, the controller 34 requests the human occupant, via the user interface 23, to take manual control of the host vehicle 10.

At block 318, if a human occupant is not in the host vehicle 10, then the method 300 continues to block 322, the controller 34 generates a planned motion to reach a minimum-risk condition and a stop. The planned motion entails a stop by the host vehicle 10 within a predetermined amount of time. The controller 34 then commands the host vehicle 10 to move according to this planned motion. After executing blocks 316, 320, and 322, the method 300 ends at block 324.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for mitigating an adversarial attack, comprising:
    receiving input data, wherein the input data includes sensor data from a plurality of sensors and map data;
    monitoring, in real time, an environment around an autonomous vehicle to identify a region of the environment around the autonomous vehicle that is possibly subject to the adversarial attack;
    determining a probability of the adversarial attack in the region of the environment around the autonomous vehicle that is possibly subject to the adversarial attack;
    determining whether the probability of the adversarial attack in the region of the environment around the autonomous vehicle that is possibly subject to the adversarial attack is greater than a predetermined threshold;
    in response to determining that the probability of the adversarial attack in the region of the environment around the autonomous vehicle that is possibly subject to the adversarial attack is greater than the predetermined threshold, planning a motion of the autonomous vehicle by taking into account the adversarial attack to generate a planned motion; and
    controlling the autonomous vehicle to move in accordance with the planned motion.

2. The method of claim 1, wherein monitoring the environment around the autonomous vehicle to identify the region of the environment around the autonomous vehicle that is possibly subject to the adversarial attack includes determining whether there is an inconsistency between the map data and the sensor data.

3. The method of claim 1, wherein monitoring the environment around the autonomous vehicle to identify the region of the environment around the autonomous vehicle that is possibly subject to the adversarial attack:
    determining a confidence score of a detection by the plurality of sensors of an object in the environment around the autonomous vehicle;
    determining whether the confidence score of the detection by the plurality of sensors of the object in the environment around the autonomous vehicle is less than a predetermined confidence threshold; and
    in response to determining that the determining that the confidence score of the detection by the plurality of sensors of the object in the environment around the autonomous vehicle is less than the predetermined confidence threshold, identifying the region where the object is located as the region of the environment around the autonomous vehicle that is possibly subject to the adversarial attack.

4. The method of claim 1, wherein the plurality of sensors includes a first sensor and a second sensor, the first sensor has a first modality, the second sensor has a second modality, the second modality is different from the first modality, and monitoring the environment around the autonomous vehicle to identify the region of the environment around the autonomous vehicle that is possibly subject to the adversarial attack includes:
    determining that there is an inconsistency in a detection or classification of an object between data from the first sensor and the data from the second sensor; and
    in response to determining that there is the inconsistency in the detection or classification of the object between the data from the first sensor and the data from the second sensor, identifying the region where the object is located as the region of the environment around the autonomous vehicle that is possibly subject to the adversarial attack.

5. The method of claim 1, wherein the sensor data includes remote actor data, the remote actor data includes information about a motion of a remote actor as detected by at least one of the plurality of sensors, the plurality of the sensors is part of the host vehicle, and monitoring, the environment around the autonomous vehicle to identify the region of the environment around the autonomous vehicle that is possibly subject to the adversarial attack includes:
    determining that there is an inconsistency between the motion of the remote actor as detected by the at least one of the plurality of sensors and other sensor data from the scene surrounding the host vehicle as detected by the at least one of the plurality of sensors; and
    in response to determining that there is an inconsistency between the motion of the remote actor as detected by the at least one of the plurality of sensors and other sensor data from the scene surrounding the host vehicle as detected by the at least one of the plurality of sensors, identifying the region where the remote actor is located as the region of the environment around the autonomous vehicle that is possibly subject to the adversarial attack.

6. The method of claim 1, further comprising:
    determining whether a human occupant is in the host vehicle; and
    requesting feedback from the human occupant in the host vehicle to confirm an existence of the adversarial attack in the region of the environment around the autonomous vehicle that is possibly subject to the adversarial attack; and
    wherein the probability of the adversarial attack in the region of the environment around the autonomous vehicle is determined in response to the human occupant confirming the existence of the adversarial attack in the region of the environment around the autonomous vehicle that is possibly subject to the adversarial attack.

7. The method of claim 1, wherein the input data includes crowd-sourced data originating from a remote actor or infrastructure device, the crowd-sourced data includes information about an existence of the adversarial attack in the region of the environment around the autonomous vehicle that is possibly subject to the adversarial attack, and the method further comprises:
    confirming the existence of the adversarial attack in the region of the environment around the autonomous vehicle that is possibly subject to the adversarial attack using the crowd-sourced data; and
    wherein the probability of the adversarial attack in the region of the environment around the autonomous vehicle is determined in response to confirming the existence of the adversarial attack in the region of the environment around the autonomous vehicle that is possibly subject to the adversarial attack using the crowd-sourced data.

8. The method of claim 1, further comprising:
determining that the probability of the adversarial attack in the region of the environment around the autonomous vehicle that is possibly subject to the adversarial attack is not available;
determining a worst-case scenario for the region of the environment around the autonomous vehicle that is possibly subject to the adversarial attack is not available; and
planning the motion of the host vehicle by taking into account the worst-case scenario.

9. The method of claim 1, further comprising:
determining whether a human occupant is in the host vehicle; and
requesting the human occupant to take manual control of the host vehicle in response to: (a) in response to determining that the probability of the adversarial attack in the region of the environment around the autonomous vehicle that is possibly subject to the adversarial attack is greater than the first predetermined threshold and less than a second predetermined threshold and (b) determining that the human occupant is in the host vehicle.

10. The method of claim 1, further comprising:
determining whether a human occupant is in the host vehicle;
planning the motion of the autonomous vehicle by taking into account the adversarial attack to generate the planned motion in response to: (a) in response to determining that the probability of the adversarial attack in the region of the environment around the autonomous vehicle that is possibly subject to the adversarial attack is greater than the first predetermined threshold or less than a second predetermined threshold and (b) determining that the human occupant is not in the host vehicle; and
wherein the planned motion includes a stop by the host vehicle within a predetermined amount of time.

11. A tangible, non-transitory, machine-readable medium, comprising machine-readable instructions, that when executed by a processor, cause the processor to:
receive input data, wherein the input data includes sensor data from a plurality of sensors and map data;
monitor, in real time, an environment around an autonomous vehicle to identify a region of the environment around the autonomous vehicle that is possibly subject to an adversarial attack;
determine a probability of the adversarial attack in the region of the environment around the autonomous vehicle that is possibly subject to the adversarial attack;
determine whether the probability of the adversarial attack in the region of the environment around the autonomous vehicle that is possibly subject to the adversarial attack is greater than a predetermined threshold;
in response to determining that the probability of the adversarial attack in the region of the environment around the autonomous vehicle that is possibly subject to the adversarial attack is greater than the predetermined threshold, plan a motion of the autonomous vehicle by taking into account the adversarial attack to generate a planned motion; and
control the autonomous vehicle to move in accordance with the planned motion.

12. The tangible, non-transitory, machine-readable medium of claim 11, wherein the tangible, non-transitory, machine-readable medium, further comprising machine-readable instructions, that when executed by the processor, causes the processor to:
determine whether there is an inconsistency between the map data and the sensor data.

13. The tangible, non-transitory, machine-readable medium of claim 12, wherein the tangible, non-transitory, machine-readable medium, further comprising machine-readable instructions, that when executed by the processor, causes the processor to:
determine a confidence score of a detection by the plurality of sensors of an object in the environment around the autonomous vehicle;
determine whether the confidence score of the detection by the plurality of sensors of the object in the environment around the autonomous vehicle is less than a predetermined confidence threshold; and
in response to determining that the determining that the confidence score of the detection by the plurality of sensors of the object in the environment around the autonomous vehicle is less than the predetermined confidence threshold, identify the region where the object is located as the region of the environment around the autonomous vehicle that is possibly subject to the adversarial attack.

14. The tangible, non-transitory, machine-readable medium of claim 12, wherein the plurality of sensors includes a first sensor and a second sensor, the first sensor has a first modality, the second sensor has a second modality, the second modality is different from the first modality, and the tangible, non-transitory, machine-readable medium, further comprising machine-readable instructions, that when executed by the processor, causes the processor to:
determine that there is an inconsistency in a detection or classification of an object between data from the first sensor and data from the second sensor; and
in response to determining that there is the inconsistency in the detection or classification of the object between data from the first sensor and data from the second sensor, identify the region where the object is located as the region of the environment around the autonomous vehicle that is possibly subject to the adversarial attack.

15. The tangible, non-transitory, machine-readable medium of claim 11, wherein the sensor data includes remote actor data, the remote actor data includes information about a motion of a remote actor as detected by at least one of the plurality of sensors, the plurality of the sensors is part of the host vehicle, and the tangible, non-transitory, machine-readable medium, further comprising machine-readable instructions, that when executed by the processor, causes the processor to:
determine that there is an inconsistency between the motion of the remote actor as detected by the at least one of the plurality of sensors and other sensor data from the scene surrounding the host vehicle as detected by the at least one of the plurality of sensors; and
in response to determining determine that there is an inconsistency between the motion of the remote actor as detected by the at least one of the plurality of sensors and other sensor data from the scene surrounding the host vehicle as detected by the at least one of the plurality of sensors, identify the region where the remote actor is located as the region of the environment around the autonomous vehicle that is possibly subject to the adversarial attack.

16. The tangible, non-transitory, machine-readable medium of claim 11, wherein the tangible, non-transitory, machine-readable medium, further comprising machine-readable instructions, that when executed by the processor, causes the processor to:
- determine that the probability of the adversarial attack in the region of the environment around the autonomous vehicle that is possibly subject to the adversarial attack is not available;
- determine a worst-case scenario for the region of the environment around the autonomous vehicle that is possibly subject to the adversarial attack is not available; and
- plan the motion of the host vehicle by taking into account the worst-case scenario.

17. The tangible, non-transitory, machine-readable medium of claim 11, wherein the input data includes crowd-sourced data originating from a remote actor, the crowd-sourced data includes information about an existence of the adversarial attack in the region of the environment around the autonomous vehicle that is possibly subject to the adversarial attack, and the tangible, non-transitory, machine-readable medium, further comprising machine-readable instructions, that when executed by the processor, causes the processor to:
- confirm the existence of the adversarial attack in the region of the environment around the autonomous vehicle that is possibly subject to the adversarial attack using the crowd-sourced data; and
- wherein the probability of the adversarial attack in the region of the environment around the autonomous vehicle is determined in response to confirming the existence of the adversarial attack in the region of the environment around the autonomous vehicle that is possibly subject to the adversarial attack using the crowd-sourced data.

18. The tangible, non-transitory, machine-readable medium of claim 11, wherein the tangible, non-transitory, machine-readable medium, further comprising machine-readable instructions, that when executed by the processor, causes the processor to:
- determine whether a human occupant is in the host vehicle;
- plan the motion of the autonomous vehicle by taking into account the adversarial attack to generate a planned motion in response to: (a) in response to determining that the probability of the adversarial attack in the region of the environment around the autonomous vehicle that is possibly subject to the adversarial attack is greater than the first predetermined threshold or less than second predetermined threshold and (b) determining that the human occupant is not in the host vehicle; and
- wherein the planned motion includes a stop by the host vehicle within a predetermined amount of time.

19. The tangible, non-transitory, machine-readable medium of claim 11, wherein the tangible, non-transitory, machine-readable medium, further comprising machine-readable instructions, that when executed by the processor, causes the processor to:
- determine whether a human occupant is in the host vehicle; and
- request the human occupant to take manual control of the host vehicle in response to: (a) in response to determining that the probability of the adversarial attack in the region of the environment around the autonomous vehicle that is possibly subject to the adversarial attack is greater than the first predetermined threshold and less than the second predetermined threshold and (b) determining that the human occupant is in the host vehicle.

20. A system for an autonomous vehicle, comprising:
- a plurality of sensors;
- a controller in communication with the plurality of sensors, wherein the controller is programmed to:
  - receive input data, wherein the input data includes sensor data from a plurality of sensors and map data;
  - monitor, in real time, an environment around the autonomous vehicle to identify a region of the environment around the autonomous vehicle that is possibly subject to the adversarial attack;
  - determine a probability of the adversarial attack in the region of the environment around the autonomous vehicle that is possibly subject to the adversarial attack;
  - determine whether the probability of the adversarial attack in the region of the environment around the autonomous vehicle that is possibly subject to the adversarial attack is greater than a predetermined threshold;
  - in response to determining that the probability of the adversarial attack in the region of the environment around the autonomous vehicle that is possibly subject to the adversarial attack is greater than the predetermined threshold, plan a motion of the autonomous vehicle by taking into account the adversarial attack to generate a planned motion; and
  - control the autonomous vehicle to move in accordance with the planned motion.

* * * * *